Feb. 18, 1964   J. A. NORTHCOTE ETAL   3,121,302
SHIELD FOR STALK CUTTER
Filed May 2, 1962                    2 Sheets-Sheet 1
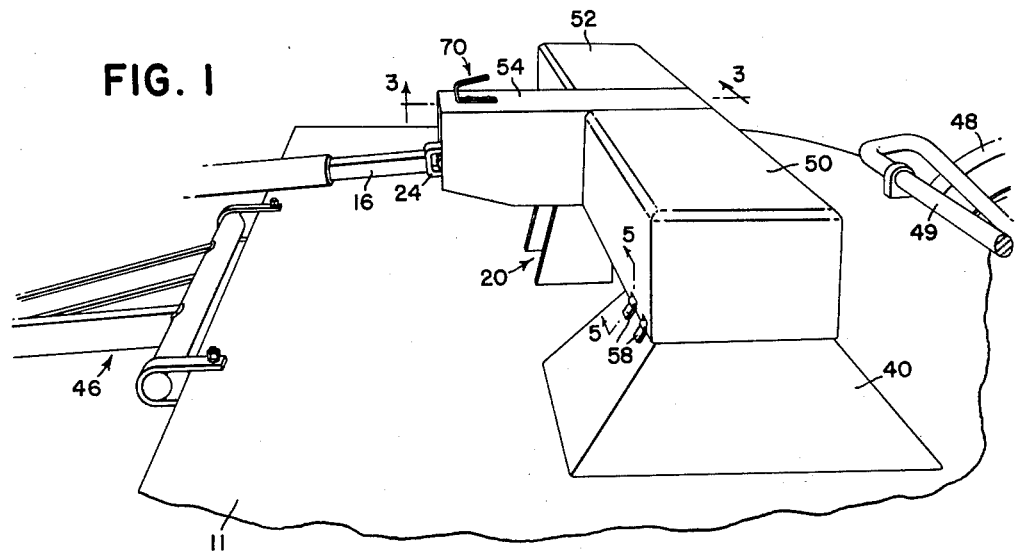
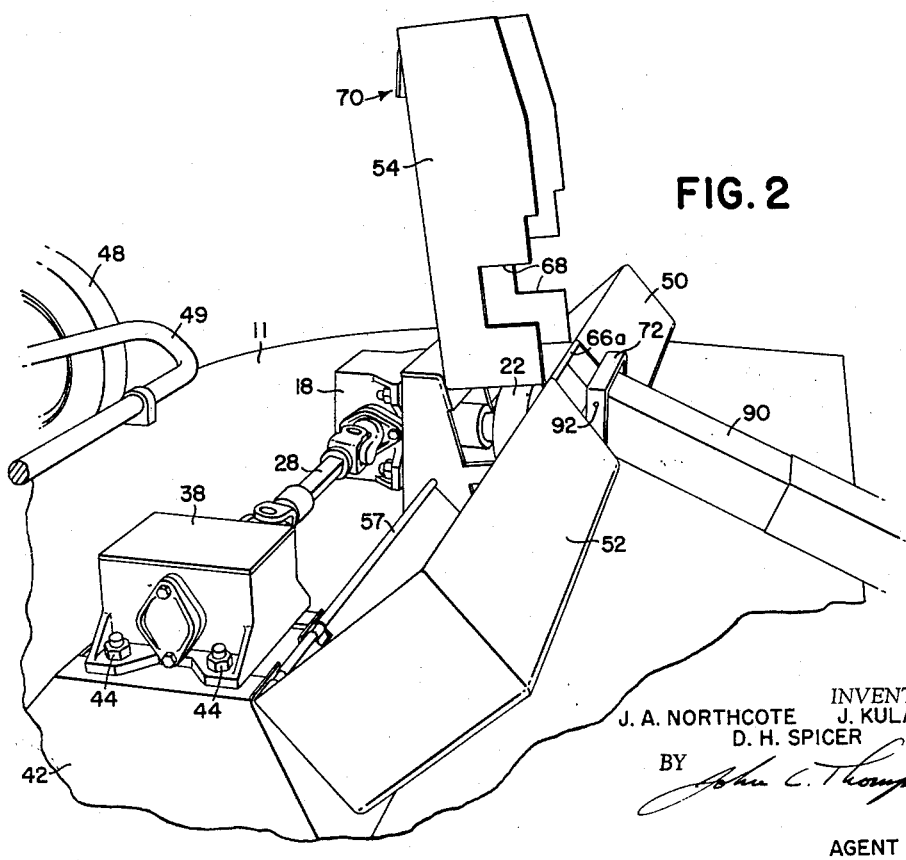
INVENTORS.
J. A. NORTHCOTE  J. KULAK
D. H. SPICER
BY
AGENT

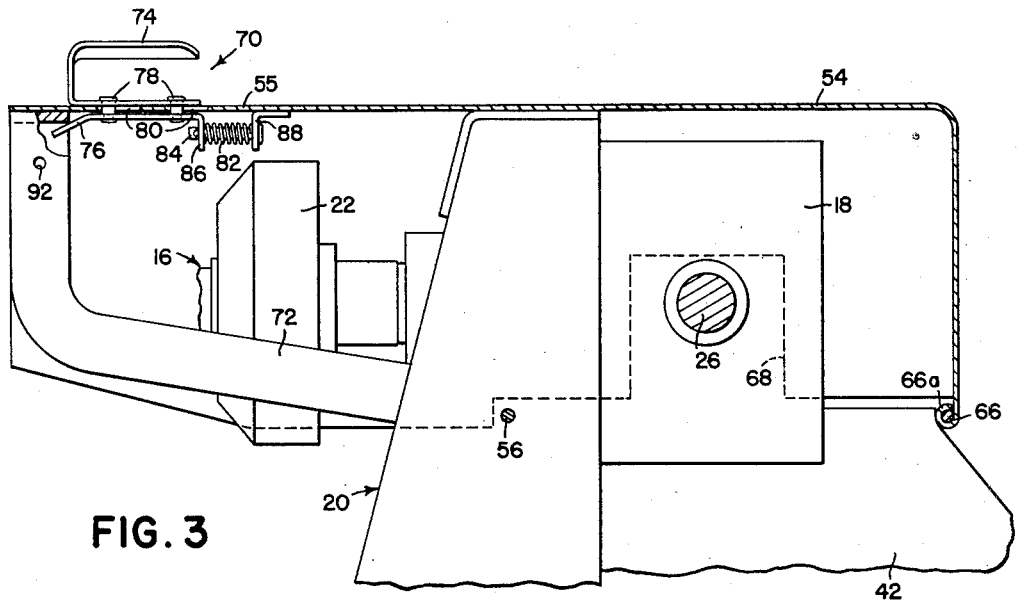
FIG. 3
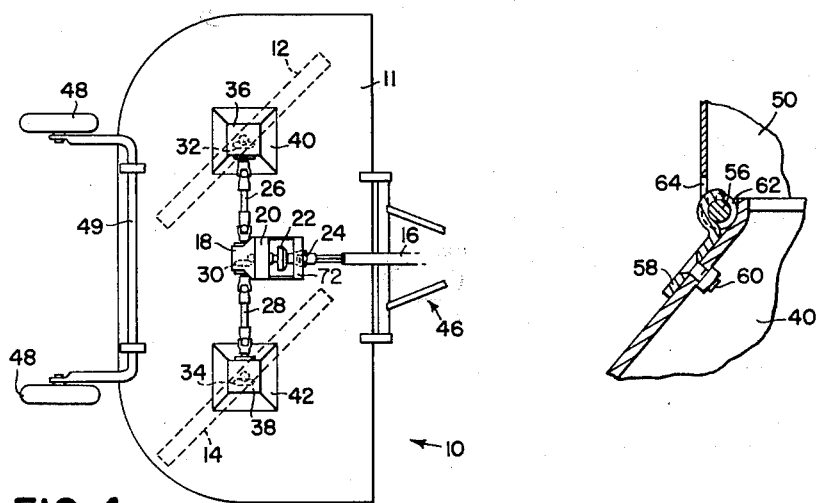
FIG. 4
FIG. 5
INVENTORS.
J. A. NORTHCOTE  J. KULAK
D. H. SPICER
BY
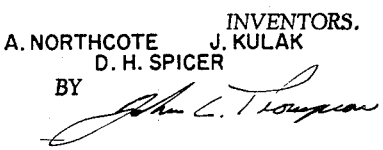
AGENT

United States Patent Office 3,121,302
Patented Feb. 18, 1964

3,121,302
SHIELD FOR STALK CUTTER
John A. Northcote, Welland, Ontario, John Kulak, Port Colborne, Ontario, and Dalton H. Spicer, Welland, Ontario, Canada, assignors to Deere & Company, Moline, Ill., a corporation of Delaware
Filed May 2, 1962, Ser. No. 191,803
4 Claims. (Cl. 56—25.4)

This invention relates generally to agricultural implements and more particularly to rotary cutters used primarily for cutting, shredding and disintegrating brush, crop stalks, and other growth, all of which is reduced to a mulch that conserves moisture, aids in clean plowing, and prevents soil erosion.

The object and general nature of this invention is the provision of a new and improved rotary cutter having a shielding construction whereby the drives and other movable parts are protected by shields that are readily moved from a shielding position to a position where the drives and other parts are accessible for servicing, repair, replacement or the like.

More specifically, it is a feature of the present invention to provide, in a cutter having sidewardly disposed rotary cutter means, side shield means and a center shield, the side shield means being held in place by the center shield without requiring separate latches or the like.

Another feature of the present invention is to provide two side shields pivotally secured to the housing of a rotary cutter having two sidewardly disposed rotary cutters, and a center shield which is in turn pivotally secured to the housing of a rotary cutter having two sidewardly disposed rotary cutters, and a center shield which is in turn pivotally secured to the side shields, the shields being so arranged and constructed that a single latch may be employed to hold both side shields and the center shield in their operative shielding positions.

These and other objects and advantages of this invention will be apparent to those skilled in the art after a consideration of the following detailed description, taken in conjunction with the accompanying drawings, in which:

FIG. 1 is a perspective view showing a rotary cutter of the multi-rotor type, in which the principles of this invention have been incorporated, the shield being shown in its latched, operative, shielding position.

FIG. 2 is a perspective view of the rotary cutter of FIG. 1, taken from the opposite side, the shield being shown in its unshielding position.

FIG. 3 is a cross-sectional view taken along the line 3—3 of FIG. 1, showing the latch holding the center shield in its shielding position.

FIG. 4 is a diagrammatic plan view with the rotary cutter in which the principles of the present invention are adapted to be incorporated, the shields not being illustrated, and FIG. 5 is a cross-sectional view taken along the line 5—5 of FIG. 1, showing the means to secure the side shield hinge to the upwardly projecting housing.

Referring first to FIG. 4, the principles of the present invention have been incorporated in a rotary cutter, indicated generally at 10, having a normally horizontally disposed rotor housing serving as a main frame 11 to which two rotary elements 12 and 14 are rotatably secured. These rotors are driven by power delivered thereto by a conventional telescoping power shaft 16 which is connected in any suitable way with the power take-off shaft of a tractor (not shown). The power shaft 16 is in turn connected through a slip clutch safety unit 22 and a universal joint 24 to a centrally disposed bevel gear housing 18, mounted on the main frame 11 by a bevel gear housing support frame 20. The gear housing 18 is provided with two transversely projecting power-transmitting shafts 26, 28 which are interconnected with the shaft 16 through bevel gears 30 disposed within the housing 18. Shafts 26 and 28 drive the spindles (not shown), on which the rotors 12 and 14 are secured through bevel gears 32, 34, which are in turn disposed in bevel gear housings 36, and 38. The rotor housing 11 includes upwardly projecting portions 40, 42 to which the housings 36 and 38 are rigidly secured, as by bolts 44 (see FIG. 2).

The forward portion of the rotor housing 11 is provided with conventional hitch means, indicated generally at 46, by which the implement may be secured to a tractor. Supporting the rearward end of the rotor housing 11 are wheels 48 which may be connected with the housing in any conventional manner, as, for example, by axle 49.

According to this invention, shield means are provided for covering not only the transversely projecting power shafts 26, 28 and their associated gear housings 36, 38, but also the centrally disposed gear housing 18, slip clutch unit 22, and universal joint 24. Referring now to FIGS. 1 and 2, the shield means comprises two side shields 50, 52 and a center shield 54. The side shields 50, 52 are pivotally secured or hinged to the forward edge of the upwardly projecting housing portions 40, 42 by means of two rods 56, one for each shield. As best illustrated in FIG. 5, in which the fastening means for the left hand rod 56 is illustrated, each rod is secured to the housing portion 40 by means of a bracket 58 which is held by the portion 40 by means of conventional fastener 60. The other end of the hinge pin is secured in a conventional manner (not illustrated) to the center bevel gear housing support frame. The side shield 50 is provided with a rolled edge portion 62 in which the rod 56 is fixed. The rolled edge 62 is cut away as at 64 for the receipt of the brackets 58. While only the fastening means for the left hand rod has been illustrated, it is to be understood that the fastening means for the right hand rod is substantially identical.

The opposite or rear end portion of side shields 50, 52 are provided with rolled edge portions 66a which are fixed about a single rod or hinge pin 66 (FIG. 3) which integrally unites the two side shields so that pivotal movement of one side shield about its rod or hinge pin 56 will cause the other side shield to also pivotally move. The center shield 54 is also provided with a rolled edge portion 66a in which the central portion of hinge pin 66 is fixed.

The sides of the center shield 54 are provided with cut out portion 68 (FIG. 2) which are adapted to receive the transversely projecting power shafts 26, 28 when the shield is in its normal shielding position illustrated in FIG. 1. The upper forward portion 55 of the center shield 54 is provided with a spring biased latch means indicated generally at 70, which is adapted to hold the center shield in its normal shielding position by engagement with the upper forward portion of an upstanding bracket 72 that is connected to the frame 11 through the center bevel gear housing support frame 20, to which the bracket 72 is welded.

The latch 70 includes a handle portion 74 disposed on the top side of the forwardly extending portion 55, and the handle 74 is secured, by means of fasteners 78 which pass through slots 80 in the portion 55, to a lockbar 76, which is disposed on the bottom side of the forwardly extending portion 55. A spring 82 normally biases the lockbar 76 in a forward direction. The spring 82 is disposed about a pin 84 which in turn is disposed in apertures (not shown) in a downturned leg 86 of the lockbar 76 and a bracket 88. The bracket 88 is rigidly secured in a conventional manner to the forwardly extending portion 55. As illustrated in FIG. 2 the forwardly extending telescoping power shaft 16 may be disposed within a guard 90. The guard 90 is pivotally secured to the bracket 72 by means of a pin 92.

In normal operating position shields 50, 52, 54 are disposed in the manner illustrated in FIG. 1. In this position the center shield is secured to the bracket 72 by means of the latch 70. This engagement will not permit the forward portion 55 to be rotated about either hinge pin 66 or pins 56. The side shields 50, 52 cannot be raised until the latch 70 is released from engagement with the bracket 72 since upward pivotal movement of the rear portions of the shields 50, 52 and about pins 56 would tend to move the portion 55 in a forward and/or upward direction, and such movement is restrained by the latch 70. To expose those parts shielded by the means 50, 52, 54, it is only necessary to disengage the latch 70 at which time the shield 54 can be raised about rod 66 and then the shields 50, 52 can be raised about rods 56 thus exposing the shielded parts.

While we have shown and described above the preferred structure in which the principles of the present invention have been incorporated, it is to be understood that our invention is not to be limited to any particular details, shown and described above, but that, in fact, widely different means may be employed in the practice of the broader aspects of our invention.

What we claim, therefore, and desire to secure by Letters Patent is:

1. A rotary cutter comprising: a substantially horizontally disposed frame; a forwardly extending centrally disposed power shaft disposed above the frame; sidewardly disposed rotary cutter means disposed below the frame and on either side of said power shaft; power transmitting means interconnecting said power shaft and said sidewardly disposed rotary cutting means; means disposed on the frame for shielding said power transmitting means, said shielding means comprising a centrally disposed shield, two sidewardly disposed shielding means, one on each side of said centrally disposed shield, axially alined hinge means securing one edge portion of each of said sidewardly disposed shielding means to the frame, the centrally disposed shield having a portion hingedly secured to the opposite edge portion of the sidewardly disposed shielding means; an upstanding bracket on said frame; and a latch mounted on the centrally disposed shield remote from said portion and adapted to engage with said upstanding bracket; whereby, when said latch is in engagement with said bracket the centrally disposed shield and said sidewardly disposed shielding means are held in their operative shielding position.

2. A rotary cutter comprising: a substantially horizontally disposed frame; a forwardly extending centrally disposed power shaft disposed above the frame; sidewardly disposed rotary cutter means disposed below the frame and on either side of said power shaft; power transmitting means interconnecting said power shaft and said sidewardly disposed rotary cutter means; means disposed on the frame for shielding said power transmitting means, said shielding means including a centrally disposed shield, two sidewardly disposed shielding means, one on each side of sidewardly disposed shield, axially alined hinge means securing the lower forward edge portion of each of said sidewardly disposed shielding means to the frame, said centrally disposed shield being secured along its lower rearward portion to the lower rearward portions of said side shields by means of an interconnecting transversely disposed hinge pin; an upstanding bracket on said frame; and a latch mounted on the forward end on said centrally disposed shield and adapted to engage with said upstanding bracket; whereby, when said latch is in engagement with said bracket, the centrally disposed shield and said sidewardly disposed shielding means are held in their operative shielding position.

3. In a rotary implement including a normally horizontally disposed rotor housing, a plurality of rotors disposed therein, a plurality of vertical spindles, each of said spindles carrying one of said rotors at its lower end and extending upwardly from the housing at its upper end, drive means fixed to the upper end of each of said vertical spindles, said drive means including a gear housing disposed between two of said rotors, normally horizontally disposed transversely extending, drive shafts operatively connecting said gear box with said rotors, and a forwardly extending telescoping power shaft operatively connected with said gear box and adapted to be driven by means remote from said implement, the improvement comprising: shield means for said gear housing and the transversely extending power shafts, said shield means including a first shield member normally covering one of said drive shafts, a second shield member normally covering the other of said drive shafts, axially alined hinge means securing the forward transversely extending edges of each of said first and second shield members to said rotor housing, and a third shield member normally disposed between said first and second shield members and adapted to cover said gear housing, said third shield member being pivotally secured to said first and second shield members at a point remote from said forward transversely extending edges; and a latch on the forward portion of said third shielding member, said latch being adapted to cooperate with said rotor housing to hold said shields in their operative shielding position.

4. A shielding apparatus for a rotary cutter having a frame, two sidewardly disposed rotors rotatably carried by said frame, a centrally disposed forwardly extending power shaft, a gear housing disposed at one end of said forwardly extending power shaft and between said sidewardly disposed rotors, and transversely extending drive shafts disposed between said gear housing and said rotors, said shielding apparatus comprising: a forwardly extending first shielding member disposed between said rotors and adapted to shield said gear housing, second and third shielding members, each of said second and third members being adapted to shield one of said transversely extending drive shafts, axially alined hinge means securing the lower forward edges of said second and third shielding members to said rotor housing, said first shielding member being pivotally secured along its lower rearward edge to a rearward portion of said second and third shielding members, a latch disposed on the forward edge of said first shielding member, and means mounted on said rotor housing and adapted to be engaged by said latch, whereby, when said latch is in engagement with said means, the shields will be held in their operative shielding position.

References Cited in the file of this patent

UNITED STATES PATENTS 2,816,410 Nobles _____ Dec. 17, 1957
3,043,082 Northcote et al. _____ July 10, 1962

OTHER REFERENCES

John Deere, Gyramor Rotary Cutter P–107, OM–WZ9–1055, page 38.